United States Patent
Colton

[11] 4,031,757
[45] June 28, 1977

[54] SONIC TRANSDUCER SURFACES

[75] Inventor: Russell F. Colton, Cedar Rapids, Iowa

[73] Assignee: J-Tec Associates, Incorporated, Cedar Rapids, Iowa

[22] Filed: Dec. 8, 1975

[21] Appl. No.: 638,356

[52] U.S. Cl. .................. 73/194 VS; 73/194 A; 310/8.7; 310/9.6

[51] Int. Cl.² .................................. G01F 1/32

[58] Field of Search ...... 73/67.5 R, 67.6 R, 67.7 R, 73/194 A, 194 VS, 71.5 US; 310/8.2, 8.7, 9.6

[56] References Cited
UNITED STATES PATENTS

| | | | |
|---|---|---|---|
| 2,486,916 | 11/1949 | Bottom | 310/9.6 |
| 2,874,568 | 2/1959 | Petermann | 73/194 |
| 2,912,853 | 11/1959 | Hanysz | 73/67.6 |
| 2,912,856 | 11/1959 | Kritz | 73/194 |
| 2,938,386 | 5/1960 | Anderson et al. | 73/67.6 |
| 2,993,373 | 7/1961 | Kritz | 73/194 |
| 3,881,352 | 5/1975 | McShane | 73/194 |
| 3,925,692 | 12/1975 | Leschek et al. | 310/8.7 |
| 3,940,986 | 5/1976 | Yamasaki et al. | 73/194 |

Primary Examiner—Herbert Goldstein
Attorney, Agent, or Firm—Griffin, Branigan & Butler

[57] ABSTRACT

The faces of transducers for transmitting or receiving sonic signals have outwardly protruding conical shapes to reduce problems caused by reflections of the sonic signals.

5 Claims, 3 Drawing Figures

SONIC TRANSDUCER SURFACES

BACKGROUND OF THE INVENTION

This invention is related to sonic signal transducers, including ultrasonic transducers. The invention has particular use as a transducer in an ultrasonic vortex velocity sensing device.

It is well known in the art to use sonic signals in various measuring and testing methods and apparatus. One such use was set forth in U.S. Pat. application, Ser. No. 857,328, filed Sept. 12, 1969, now U.S. Pat. No. 3,680,375 and entitled "Sonic Velocity Sensing." This patent discloses a method and apparatus for sensing the rate of Karman vortex generation. In accordance with the well known Karman vortex phenomena, a fluctuating flow field, more commonly referred to as a Karman vortex street or trail, is formed in the wake of a strut mounted in a fluid stream. The fluid may be either gaseous or liquid. The rate of vortex generation provides an indication of the relative velocity between the body to which the strut is attached and the movement of the fluid stream. As set forth in the above patent application, a sonic signal is transmitted across the fluid stream and is modulated by the vortices in the stream. An indication of velocity is provided by detecting the modulation frequency of the sonic signal.

In use of the above vortex velocity sensor, it has been found that sonic signals reflected from a receiving transducer and then back again from a transmitting transducer will, when out of phase with a transmitted signal, cause destructive addition which reduces the modulation content of a received signal. Under zero flow conditions, the frequency of the transmitted signal can be tuned such that the reflected signal will be in phase with the transmitted signal. However, under flow conditions where the sonic energy is swept downstream at the fluid velocity, the reflections may take a variety of path lengths, depending on the flow conditions. Proper tuning of the transmitted frequency will also depend on temperatures which effect the speed of sound. Under given flow conditions, a frequency can be selected which gives reasonable test results. However, this critical frequency must generally be maintained within approximately 0.25% accuracy.

A number of techniques are employed to avoid the necessity of maintaining a critical frequency in transmitting the sonic signal. One such technique is the use of an acoustical lens having a conically shaped outer surface attached to the acoustic transmitting transducer. The conical surface tends to disperse any sonic reflections such that they do not interfere with the transmitted signals. The technique introduces additional problems in that bonding between the acoustic lens and the transducer is extremely critical. Also it is required that the resonant frequency of the acoustic lens is matched very closely to the resonant frequency of the transducer. These limitations cause considerable manufacturing problems and require that each device be individually tested to achieve proper operation.

Another technique employed is to mount the transmitting transducer without an acoustic lens, but at an angle such that reflections from the face of the transmitting transducer misses the receiving transducer on subsequent bounces. This techniques causes the loss of considerable acoustic energy and also presents complications in the manufacture of the instrument since it is required that transducer holders be inclined with respect to each other.

It is therefore an object of this invention to provide a sonic transducer which substantially reduces the problems caused by interference between reflected and transmitted sonic signals.

It is a further object of this invention to provide such a sonic transducer which is relatively free from manufacturing and economic complications presented by other prior art systems.

SUMMARY OF THE INVENTION

In accordance with principles of this invention, a sonic transducer is provided having an outwardly-protruding conically shaped surface which disperses reflected waves. In a preferred embodiment of the invention, both a transmitting transducer and a receiving transducer have conically shaped outer surfaces such that reflected waves not fully dispersed by the receiving transducer will be further dispersed when reflected from the transmitting transducer.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention in a clear manner.

DESCRIPTION OF A PREFERRED EMBODIMENT

Figure 1:
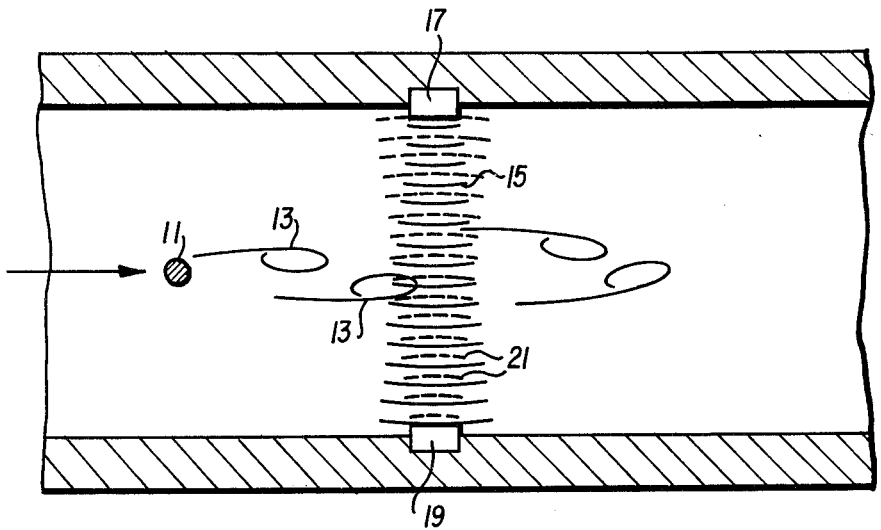
FIG. 1 is a schematic diagram illustrating a prior art, sonic velocity sensing system.
Figure 2:
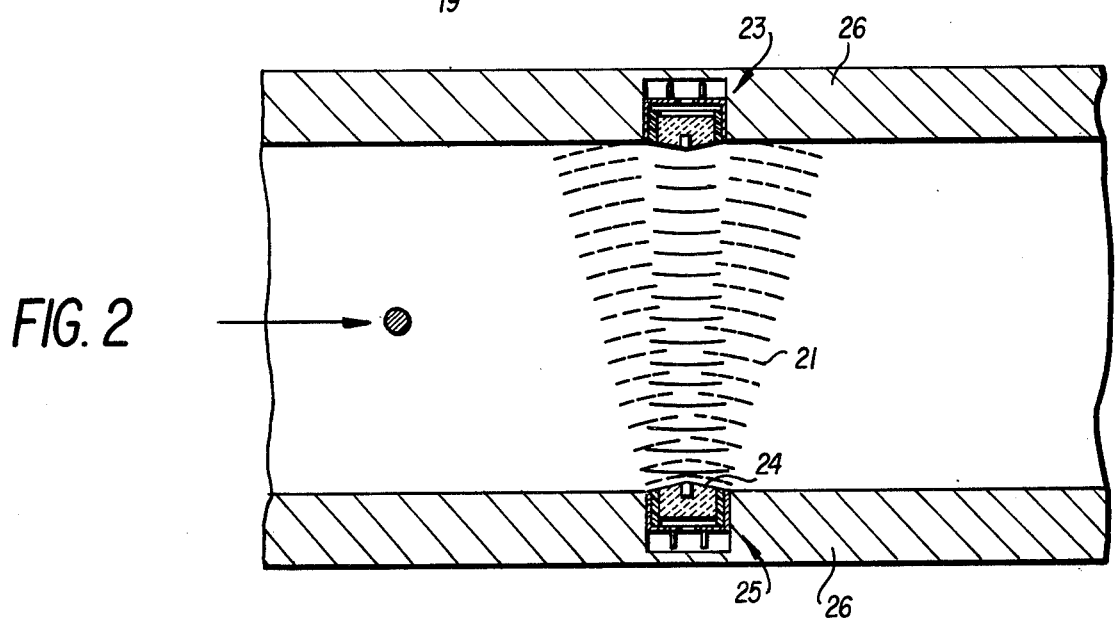
FIG. 2 is a partially sectioned, partially schematic diagram of an embodiment of the present invention.

A prior art use of sonic signals in a measuring system is shown in FIG. 1 to illustrate the problem presented by reflected waves in systems using flat-faced transducers. In the FIG. 1 system a fluid flows past the strut 11 creating vortices 13. The vortices modulate the transmitted sonic waves 15 which are transmitted from a flat-faced crystal transmitting transducer 17 to a flat-faced crystal receiving transducer 19. As shown, a portion of the transmitted waves are reflected from the face of the receiving transducer 19 back toward the transmitting transducer 17 as reflected waves 21. When the reflected waves 21 are again reflected, this time from the transmitting transducer 17, they are out of phase with the transmitted sonic waves 15 thus causing a destructive interference FIG. 2 shows the use of crystal transducers made in accordance with the present invention in a measuring system of the type shown in FIG. 1. Sonic waves are transmitted from a transmitting transducer 23 toward a receiving transducer 25. The face 24 of the receiving transducer 25 is outwardly protruding and conically shaped. Thus, as shown, the reflected waves 21 reflected from the transducer 25 are dispersed such that they are not directed back toward the transmitting transducer 23. In the embodiment shown, the face of the transmitting transducer is also conically shaped to provide more complete dispersion. A cone angle of inclination with a plane normal to the direction of transmitted sonic waves of about 10° has been found to give excellent results.

Figure 3:
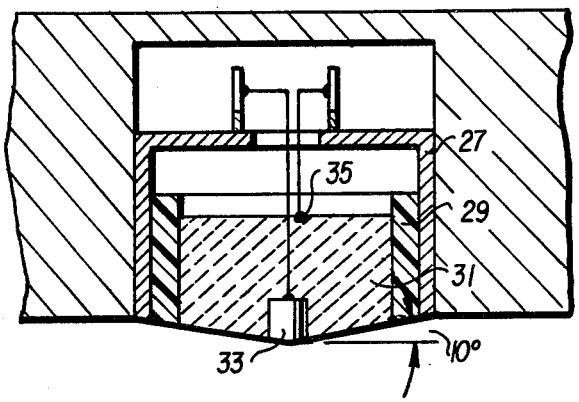

In the specific embodiment shown in FIGS. 2 and 3 the transducers 23 and 25 are mounted in supporting structures 26 which comprises shielding cans 27 (FIG. 3) and relatively soft isolating material 29. Piezoelectric transducers 31 whose face actually form the outwardly-protruding conical surfaces are mounted in the isolatng material 29. The isolating materail 29 is corprene, silicon rubber, or foam neoprene, however, other materials may also be used. It will be noted that the tapers of the transducer faces extend from their centers through the can 27 to avoid reflections from area surrounding the transducers 23 and 25. Isolated terminals 33 and 35 are attached to the piezoelectric transducers 31.

Performance of sonic transducers having conically shaped faces have been found to be far superior to those described as being in the prior art above. In this regard, it has been found that when sonic transducers are used in a fluid sensing system, a carrier frequency can be set anywhere within the receiving sonic transducer's resonant bandwidth without degradation of the received signal.

While the invention has been particularly shown and described with reference to a preferred embodiment thereof, it will be understood by those skilled in the art that various changes in form and detail may be made therein without departing from the spirit and scope of the invention.

What is claimed is:

1. In a sonic velocity sensor system of the type comprising a vortex generating strut, a sonic signal transmitting transducer, and a sonic signal receiving transducer, the improvement wherein:
   at least one of said sonic signal transducers is formed of a single integral crystal which has a conically-shaped faced surface.

2. In a sonic velocity sensor as in claim 1 wherein said sonic signal transducer having a conical face is the sonic signal receiving transducer.

3. The improvement of claim 2 wherein said conically-shaped face surface is outwardly protruding and has an angle of inclination of about 10° — with a plane normal to the direction of sonic signals transmitted by said transmitting transducer.

4. The improvement of claim 1 wherein both said transmitting and receiving transducers have outwardly-protruding conically-shaped face surfaces.

5. The improvement of claim 4 wherein said conical faces have angles of inclination of about 10° with a plane normal to the direction of sonic signals transmitted by said transmitting transducer.

* * * * *

UNITED STATES PATENT AND TRADEMARK OFFICE
CERTIFICATE OF CORRECTION

PATENT NO. : 4,031,757
DATED : June 28, 1977
INVENTOR(S) : Russell F. Colton

It is certified that error appears in the above-identified patent and that said Letters Patent are hereby corrected as shown below:

Column 2, line 36, insert as a subparagraph after "invention.":

-- FIG. 3 is an enlarged fragmentary sectional view of a transducer assembly illustrated in FIG. 2. --

Column 4, line 10, change "faced" to -- face --.

Signed and Sealed this

Twenty-second Day of May 1979

[SEAL]

Attest:

RUTH C. MASON
Attesting Officer

DONALD W. BANNER
Commissioner of Patents and Trademarks